United States Patent [19]

Ginatta

[11] Patent Number: 4,481,098

[45] Date of Patent: Nov. 6, 1984

[54] FRAME FOR SUPPORTING AND TREATING SPENT ELECTRICAL ACCUMULATORS IN PROCESSES FOR THE ELECTROCHEMICAL EXTRACTION OF THE METALS CONTAINED THEREIN

[75] Inventor: Marco Ginatta, Turin, Italy

[73] Assignee: Snamprogetti S.p.A., Milan, Italy

[21] Appl. No.: 493,628

[22] Filed: May 11, 1983

[30] Foreign Application Priority Data

May 27, 1982 [IT] Italy ............................... 21510 A/82

[51] Int. Cl.³ ............................................. C25D 17/04
[52] U.S. Cl. ................................................ 204/297 W
[58] Field of Search ............... 204/297 W, 297 R, 287

[56] References Cited

U.S. PATENT DOCUMENTS 3,090,823  5/1963  Roach ........................... 204/297 W
4,134,819  1/1979  Kreisel ............................ 204/297 R
4,328,087  5/1982  Maschler ....................... 204/297 W Primary Examiner—John F. Niebling
Attorney, Agent, or Firm—Morgan, Finnegan, Pine, Foley & Lee

[57] ABSTRACT

In processes for electrochemically extracting the metals contained in spent electrical accumulators, the accumulators are first immersed in activation tanks and then placed in dissolving tanks after connecting their poles to the direct current supply cables.

This patent application discloses a plastics frame structure comprising numerous seats, each of which can house one accumulator. Each frame is provided with current-carrying bars from which there branch plastics-covered copper or aluminum cables, on the ends of which there are special contacts which are mounted on to the accumulator poles. The contacts are constructed in such a manner so as to protect the accumulator poles from being corroded by the electrolyte solution into which the frame is immersed.

The use of the frame according to the invention simplifies and accelerates all the process operations, leading to a large reduction in operating costs.

13 Claims, 6 Drawing Figures

FRAME FOR SUPPORTING AND TREATING SPENT ELECTRICAL ACCUMULATORS IN PROCESSES FOR THE ELECTROCHEMICAL EXTRACTION OF THE METALS CONTAINED THEREIN

This invention relates to a rigid parallelepiped plastics frame comprising compartments of the same shape, each of which can house an electrical accumulator. This frame, provided with current-carrying bars and electric cables for connecting the current-carrying bars to the individual accumulators housed in it, simplifies and accelerates all the operations concerned in the treatment of spent electrical accumulators for electrochemically extracting the metals contained therein.

In particular, said frame allows rapid loading of the accumulators into their individual seats, rapid connection of the poles of each accumulator to the current-carrying bars, and the simultaneous immersion of all the accumulators first into the activation tanks and then into the dissolving tanks. The ends of the electric cables which connect the accumulator poles to the current-carrying bars are provided with contacts which are protected by special plastics or synthetic rubber sheaths which, when mounted, isolate the accumulator poles from the electrolyte solution and prevent the poles from dissolving.

Patents by the author of the present application describe a process for the electrochemical extraction and recovery of the metals contained in spent electrical accumulators.

This process comprises essentially the following operations:

(1) Cutting the bases of the spent accumulators to discharge the electrolyte solution contained in them, using a method and machine already patented by the author of the present application;
(2) Activating or recharging the spent accumulators by immersing them in tanks containing water and sulphuric acid;
(3) Washing the interior and exterior of the baseless accumulators with water or alkaline solutions;
(4) Immersing the electrically connected accumulators into the dissolving tanks containing an electrolyte;
(5) Circulating the electrolyte through and around the accumulators; and
(6) Forced dissolving of the accumulator electrodes.

The accumulator support frames of the present invention enable the aforesaid operations to be effected more easily and rapidly, to obtain a high production rate and thus keep operating costs at a very low level.

The structure of an accumulator support frame having a parallelepiped form is described hereinafter with reference to FIGS. 1 and 2.

The use of other geometrical forms does not change the substance of the invention.

Figure 1:
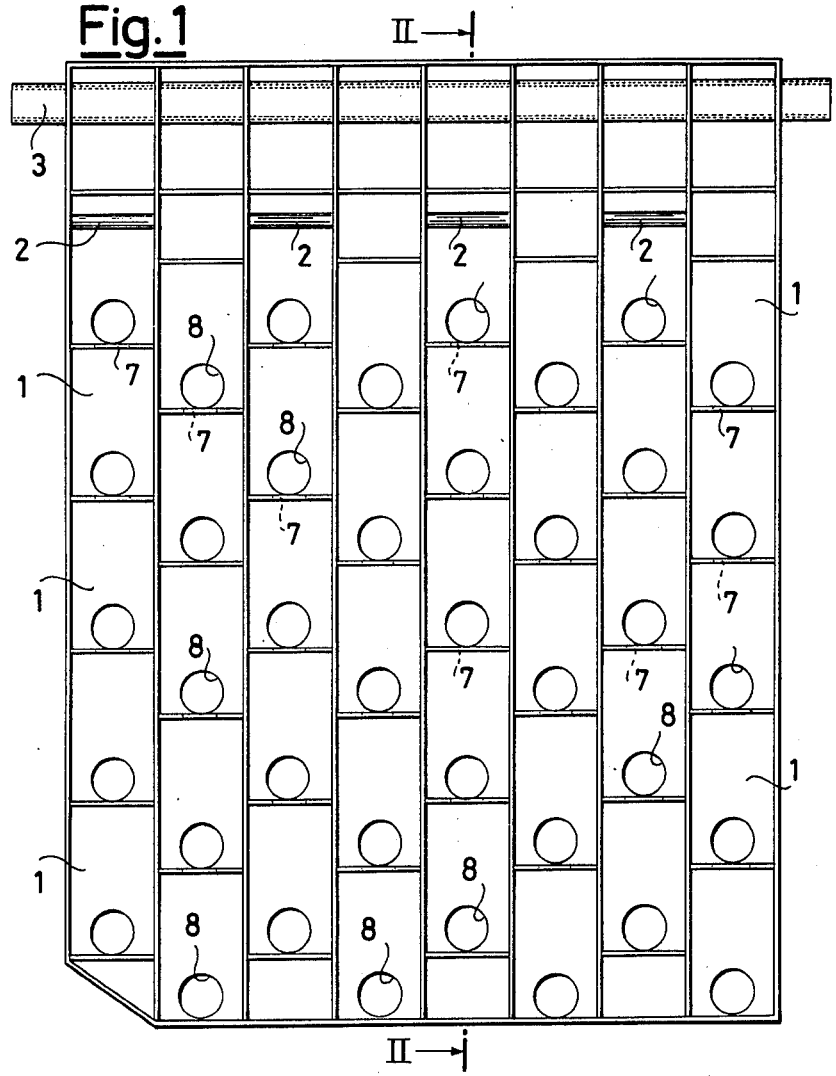
FIG. 1 is a front view of an example of an accumulator support frame.
Figure 2:
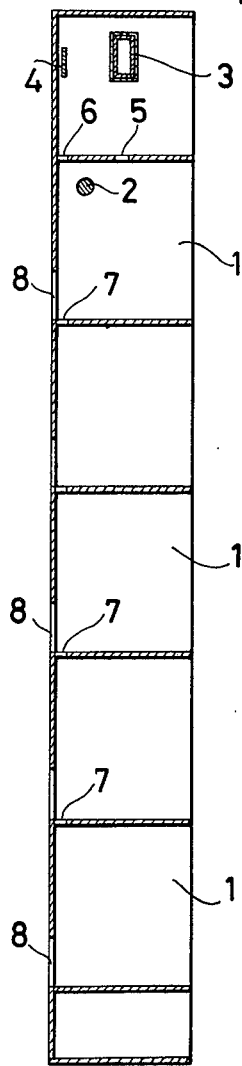
FIG. 2 is a section on the line II—II of FIG. 1.

The frame of FIG. 1 comprises 40 seats 1 disposed in eight columns and five horizontal offset rows. The entire structure is of rigid polypropylene with strengthening bars 2.

Each frame further includes two current-carrying bars, a negative one composed of a steel tube of square or circular cross-section 3 clad with sheet copper or any other electrically conducting material, and a positive one composed of a copper plate 4.

The negative bar with the core of copper-clad steel also has to support the empty and full weight of the frame when it is moved or raised for immersion into the activation and dissolving tanks. Copper or aluminium cables covered with insulating material (usually PCE) branch from the current-carrying bars 3 and 4, and pass through the holes 5 and 6 and through the slots 7 to reach the poles of the individual accumulators housed in the compartments 1, and are connected to said accumulators.

The rear wall of each compartment comprises a circular hole 8 having a diameter of about 10 cm.

The electrolyte solution into which the frame is immersed can circulate freely through holes 8 to make contact with all parts of the accumulators.

Figure 3:
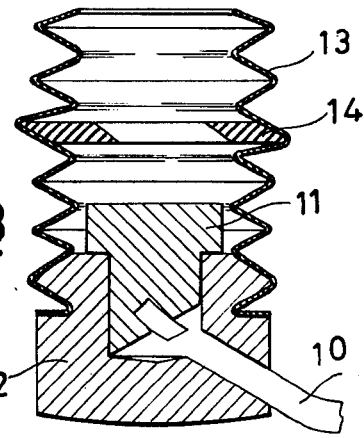
FIG. 3 is a longitudinal section through one of the contacts by which the accumulator poles are connected to the electric cables originating from the current-carrying bars.

A positive cable and a negative cable extend into each compartment and the ends of the cables comprising the contacts shown in FIG. 3 are manually mounted on to the accumulator poles.

Figure 4:
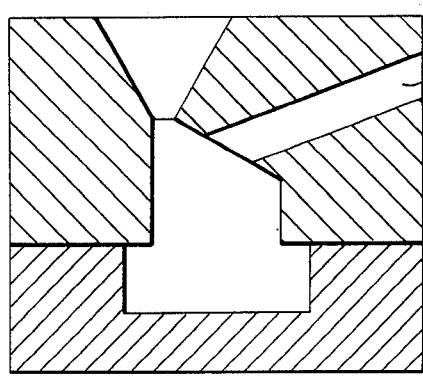
FIG. 4 is a section through the mould for casting the lead piece 11 shown in FIG. 5 and for making the connection to the electric cable 3.

These contacts are manufactued by first inserting the end of cable 10 through bore 9, then pouring molten lead into the mould as shown in FIG. 4.

Figure 5:
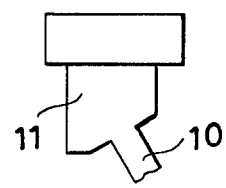
Figure 6:
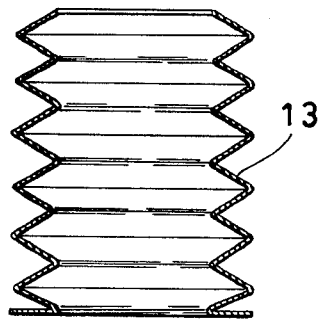
FIG. 6 is a section through the synthetic rubber bellows 13.

A lead piece 11 is obtained having the form shown in FIG. 5. This piece with cable 10 connected to it is inserted into a plastics seat 12 which is connected to a rubber bellows 13 shown in FIG. 6, the purpose of which is to prevent electrolyte circulation and thus protect the contacts and accumulator poles from corrosion.

Inside the bellows there is a rubber washer 14 which provides for attachment of the contact to the accumulator pole and for further prevention of electrolyte circulation.

The assembly shown in FIG. 3 comprising the lead piece 11 connected to the cable 10, the plastics seat 12, the rubber bellows 13 and the rubber washer 14 is defined as a protected contact.

I claim:

1. A frame for supporting and treating spent electrical accumulators in processes for the electrochemical extraction of the metals contained therein comprising:

(i) a plurality of parallelepiped compartments, each said compartment housing an electrical accumulator having at least one pole for receiving an electrical contact;

(ii) two current-carrying bars connected to said frame at its top end, one of said current-carrying bars being negative and composed of a steel tube clad in sheet copper and the other said current-carrying bar being positive and composed of a copper plate; and (iii) a plurality of cables covered with insulating material, each said cable connected at one end to one of said current-carrying bars and having said electrical contact on its opposite end for receiving and protectively engaging said pole of said electrical accumulator.

2. A frame as defined in claim 1 in which said parallelepiped compartments are made of a corrosion-resistant material.

3. A frame as defined in claim 1 in which said parallelepiped compartments are made of rigid polypropylene.

4. A frame as defined in claim 1 in which said negative current-carrying bar is made of a steel tube of circular cross-section clad in sheet copper.

5. A frame as defined in claim 1 in which said negative current carrying bar is made of a steel tube of square cross-section clad in sheet copper.

6. A frame as defined in claim 1 in which said cables have a positive electrical current.

7. A frame as defined in claim 1 in which said cables have a negative electric current.

8. A frame as defined in claim 1 in which said cables are made of copper.

9. A frame as defined in claim 1 in which said cables are made of aluminum.

10. A frame as defined in claim 1 in which said cables extend from said current-carrying bars and pass through holes and slots provided in said frame to engage said poles of said electrical accumulators.

11. A frame as defined in claim 1 in which said electrical contact on said cable includes a plastic seat and a bellows composed of a non-conductive flexible material for protecting said accumulator pole from electrolyte corrosion when said accumulator is in engagement with said contact.

12. A frame as defined in claim 1 in which each said parallelepiped compartment includes a passage through which an electrolyte solution in which said frame is immersed can freely circulate.

13. A frame as defined in claim 12 in which said passage is of about 10 cm in diameter.

* * * * *